United States Patent
Ori

(10) Patent No.: US 6,353,588 B1
(45) Date of Patent: Mar. 5, 2002

(54) OBJECTIVE LENS USED WITH HIGH DENSITY OPTICAL RECORDING MEDIUM

(75) Inventor: Tetsuya Ori, Saitama (JP)

(73) Assignee: Fuji Photo Optical Co., Ltd., Omiya (JP)

(*) Notice: Subject to any disclaimer, the term of this patent is extended or adjusted under 35 U.S.C. 154(b) by 0 days.

(21) Appl. No.: 09/461,017

(22) Filed: Dec. 15, 1999

(30) Foreign Application Priority Data

Dec. 17, 1998 (JP) ............................................. 10-359471

(51) Int. Cl.⁷ ................................................. G11B 7/00
(52) U.S. Cl. .................... 369/112.24; 359/717; 359/719
(58) Field of Search ...................... 369/112.23, 112.24, 369/112.25, 44.23; 359/708, 719, 811, 819, 717, 713, 714, 715, 716

(56) References Cited

FOREIGN PATENT DOCUMENTS

JP            10-123410            5/1998

*Primary Examiner*—Thang V. Tran
(74) *Attorney, Agent, or Firm*—Arnold International; Bruce Y. Arnold

(57) ABSTRACT

An objective lens having no more that two lens elements with refractive power is disclosed for reading or writing at high density on a recording medium. The first lens element, in order from a light source side, is biconvex and includes at least one aspheric surface so that it is individually well-corrected for spherical aberration. The second lens element is of a meniscus shape with its concave surface on the recording medium side of the objective lens. If the objective lens is used without a cover glass at the recording medium, the convex surface of the second lens element is made to have an aplanatic surface, which is a surface that is capable of changing the convergence or divergence of a cone of rays without introducing any spherical aberration, coma or astigmatism. Whether or not there is a cover glass at the recording medium, the following condition is satisfied $$0.8 < R_4/BF < 1.2$$

where $R_4$ is the radius of curvature of the surface on the optical recording side of the second lens element $L_2$, and BF is the back focal length of objective lens.

The surface of the second lens element on the optical recording medium side is preferably made to be normal to rays converging to/diverging from the focus of the objective lens, thereby minimizing aberrations. If there is no cover glass, this is accomplished by making $R_4$ equal BF. In addition, the following condition is preferably satisfied $$1.45 < F_1/F < 1.7$$

where $F_1$ is the focal length of the first lens element, and
F is the focal length of the objective lens.

7 Claims, 4 Drawing Sheets

Embodiment 1

Embodiments 1 - 3
(first lens element)

Embodiment 1
(Objective Lens)

Embodiment 4

Embodiment 4

ОBJECTIVE LENS USED WITH HIGH DENSITY OPTICAL RECORDING MEDIUM

BACKGROUND OF THE INVENTION

In recent years, CD's (compact disks), MO (magneto-optical) disks and DVD's (digital video disks) have been used as optical recording media for recording data such as video images and the like, as well as a recording media for computers. The objective lenses that are used with an optical pick-up device for accomplishing the writing or reading of data signals with these recording media usually have a numerical aperture of about 0.45 for CD's, 0.5–0.6 for MO disks and 0.6 for DVD's. In addition, there has been a strong demand for optical pick-up devices to be miniaturized, light weight, and low cost. In order to satisfy these requirements, the objective lens is often made of a synthetic resin material having at least one aspherical surface, or the lens is formed from glass material having at least one aspherical surface.

With the recent rapid growth of data recording capacity, there has been a desire for recording at higher density on recording media, and thus an on-going effort has been made to improve the recording density of optical recording media. This trend in higher density recording makes it necessary for the light collecting spot formed by the objective lens to be smaller. The diameter D of the light collecting spot, where the wavelength of the light source is $\lambda$, and the numerical aperture of the objective lens is NA, is shown by the following Equation (1):

$$D = k\lambda/NA \qquad \text{Equation (1)}$$

where k is a constant.

Thus, in order to make the light collecting spot smaller, it is necessary to either shorten the wavelength of the light source, or to use an objective lens having a higher numerical aperture. Shortening the wavelength of the light source requires either a shorter base wavelength semiconductor laser light source or the use of second harmonic generation techniques.

On the other hand, efforts for making an objective lens of higher numerical aperture have continued through the adoption of an objective lens formed of a conventional aspheric single lens element, and this has resulted in a numerical aperture as high as 0.6. However, in further pursuing an objective lens having a higher numerical aperture, there is a problem of the inherent limitations of using a single aspheric lens element. Thus, in Japanese Laid Open Patent Application No. 10-123410, use is made of a two lens element construction in order to achieve an objective lens having numerical aperture of approximately 0.7. However, in the objective lens disclosed in this patent application there is an added complexity both in terms of design and construction in comparison with an objective lens consisting of a single lens element, and this requires an increase in labor and cost. Furthermore, since quality assurance methods for an objective lens having two lens groups (each formed of a single lens element) are generally more complex than for an objective lens using a single lens element, there is generally an increase in the cost of product due solely to the increased cost of inspection of such a two-group objective lens.

BRIEF SUMMARY OF THE INVENTION

The present invention relates to an objective lens used with an optical recording medium that stores information at a high density and, in particular, relates to an objective lens used in a pick up device which accomplishes the writing or reading of data signals on an optical disk, a magneto-optical disk, an optical recording medium of an optical card, and the like at a high density.

A first object of the present invention is to provide an objective lens for high density optical recording wherein aberrations are well-corrected using a two-group, two lens element construction in which the numerical aperture is 0.6 or greater. A second object of the invention is to provide an objective lens having a simple design and construction, which may be easily and inexpensively inspected for quality assurance purposes.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The objective lens of the present invention is formed so as to include, in order from a light source side: a first lens element of positive refractive power and biconvex shape wherein both surfaces are aspherical with different paraxial radii of curvature and with the surface of larger radius of curvature on the optical recording medium side, and a second lens element of a meniscus shape with its convex surface on the side of the light source. The shapes of the aspherical surfaces of the first lens element $L_1$ are given by the following Equation (2).

$$Z = (Y^2/R^2)/((1+(1-KY^2/R^2)^{1/2}) + A_4Y^4 + A_6Y^6 + A_8Y^8 + A_{10}Y^{10} \qquad \text{Equation (2)}$$

where

Z is the distance to the tangent plane of the vertex of the aspherical surface from a point on the aspherical surface at height Y from the optical axis, Y is the height from the optical axis, $A_4$, $A_6$, $A_8$ and $A_{10}$ are aspherical coefficients, K is the eccentricity, and R is the radius of paraxial curvature of the aspherical surface.

If there is no cover glass, the second lens element is ideally made to have an aplanatic surface, as will be dis cussed in more detail later. Furthermore, it is desirable that the first lens element be constructed so that its aberrations are independently well-corrected. Even if there is a cover glass, the radius of curvature of the surface of the second lens element nearest the light recording medium is made to be approximately equal to the back focal length of the objective lens by satisfying the following Condition (1).

$$0.8 < R_4/BF < 1.2 \quad \text{Condition (1)}$$

where $R_4$ is the radius of curvature of the surface of the second lens element nearest the optical recording medium, and BF is the back focus length of the objective lens.

Furthermore, the objective lens of the present invention preferably satisfies the following Condition (2).

$$1.45 < F_1/F < 1.7 \quad \text{Condition (2)}$$

where $F_1$ is the focal length of the first lens element of the objective lens, and F is the focal length of the objective lens.

Embodiments 1–5 of the present invention will be discussed hereinafter with reference to the drawings.

Embodiment 1

Figure 1:
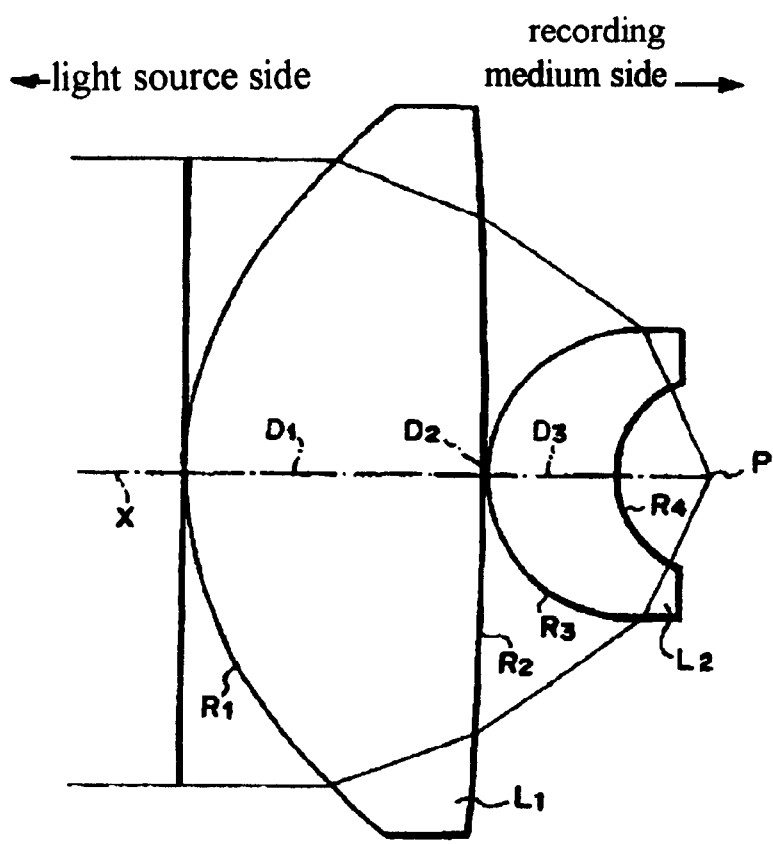
FIG. 1 shows the lens element construction and ray paths of an objective lens of Embodiments 1–3 that may be used for high density optical recording or reading of data.

FIG. 1 shows the lens element construction and ray paths of an objective lens according to Embodiment 1, where P is the light collecting point, and X is the optical axis. As shown in FIG. 1, the objective lens of Embodiment 1 includes, in order from the light source side: a first lens element $L_1$ of positive refractive power and biconvex shape, having aspherical surfaces with different paraxial radii of curvature, with the surface of larger radius of curvature on the side of the recording medium; and a second lens element $L_2$ in the shape of a meniscus lens having its concave surface on the side of the light recording medium.

In this embodiment, the second lens element $L_2$ has an aplanatic surface. By this means, the light flux received from the first lens element that is incident onto the surface of the second lens element $L_2$ is refracted without any spherical aberration being generated by this surface and the sine condition is satisfied. (The sine condition is the required condition under which a small region of the object plane in the neighborhood of the optical axis is imaged sharply by rays of any angular divergence.)

The first lens element $L_1$ is constructed so that aberrations are well-corrected for this lens element alone. At the time of designing or evaluating the objective lens, the fact that the first lens element has been independently well-corrected for aberrations enables consideration to then be given solely to ensuring that the second lens element $L_2$ is well-corrected for aberrations. In this manner, the quality assurance process for an objective lens formed of the combination of lens elements $L_1$ and $L_2$ is simplified and thus its cost is reduced.

Table 1 below shows, for Embodiment 1 of the present invention, the surface number # in order from the light source side, the radius of curvature R (in mm) of each surface, the on-axis surface spacing D (in mm), as well as the index of refraction N and the Abbe number ν at the wavelength 413 nm of each lens element. Those surfaces with a * to the right of the surface number are ashperic, with the aspheric coefficients given in the middle portion of Table 1. The lower portion of Table 1 gives the incident light flux diameter Φ (in mm), the focal length F (in mm) of the objective lens, the focal length $F_1$ (in mm) of the first lens element $L_1$, the back focus BF (in mm) of the objective lens, as well as the values corresponding to the Conditions (1) and (2).

TABLE 1

| Surface No. # | On-axis Radius of Curvature (R) | On-axis surface spacing (D) | Index of Refraction N at λ = 413 nm | Abbe No. ν at λ = 413 nm |
|---|---|---|---|---|
| 1* | 2.6586 | 2.30000 | 1.603351 | 61.9 |
| 2* | −29.0491 | 0.02690 | 1.000000 | |
| 3 | 1.0649 | 1.00000 | 1.603351 | 61.9 |
| 4 | 0.7290 | | 1.00000 | |

Aspheric Coefficients

| # | $A_4$ | $A_6$ | $A_8$ | $A_{10}$ | K |
|---|---|---|---|---|---|
| 1 | $0.3590876 \times 10^{-2}$ | $0.8604661 \times 10^{-4}$ | $0.5038918 \times 10^{-6}$ | $-0.1439604 \times 10^{-5}$ | 0.0 |
| 2 | $0.4883467 \times 10^{-2}$ | $-0.1069792 \times 10^{-2}$ | $0.1095095 \times 10^{-3}$ | $-0.4841916 \times 10^{-5}$ | 0.0 |

Incident light flux diameter Φ=4.66 F=2.5884 $F_1$=4.1502 BF=0.729

Condition (1) value: $R_4$/BF=1.0000

Condition (2) value: $F_1$/F=1.6034

Thus, Embodiment 1 satisfies Conditions (1) and (2).

Figure 2:
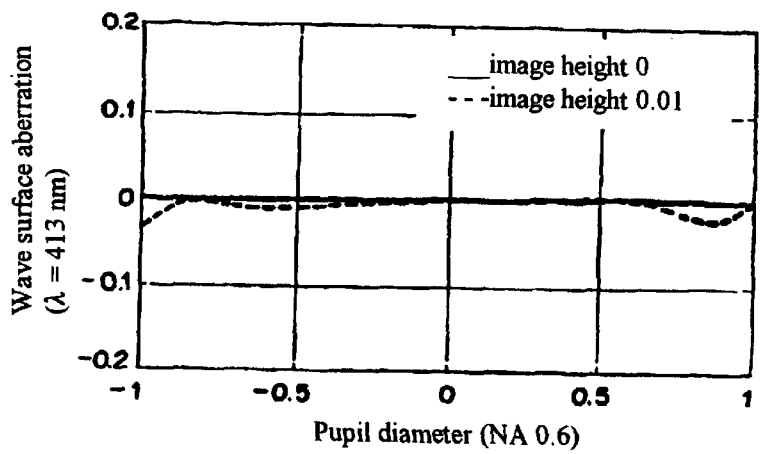
FIG. 2 shows, for two image heights, the wave surface aberration as a function of pupil diameter at a wavelength 413 nm of the first lens element of Embodiments 1–3.

FIG. 2 shows the wave surface aberration, at two image heights, as a function of pupil diameter for the first lens element of Embodiment 1 at a wavelength of 413 nm. As shown in FIG. 2, the first lens element $L_1$, individually, is well-corrected for aberrations.

Figure 3:
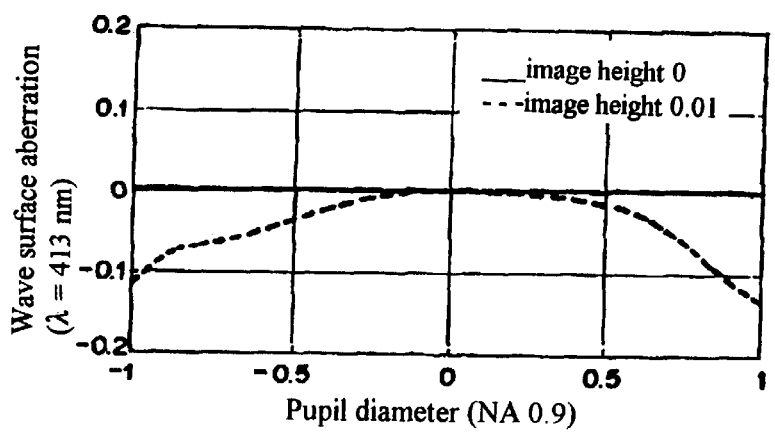
FIG. 3 shows, for two image heights, the wave surface aberration as a function of pupil diameter at a wavelength of 413 nm of the objective lens of Embodiment 1.

FIG. 3 shows the wave surface aberration as a function of pupil diameter for the objective lens of Embodiment 1 at a wavelength of 413 nm for the same two image heights as shown in FIG. 2. As apparent from FIG. 3, the objective lens has well-corrected aberrations.

The operation of the objective lens of Embodiment 1 will now be explained. The first lens element $L_1$ is made with both surfaces thereof being aspheric and so that aberrations are well corrected for this lens element independently. The second lens element $L_2$ is made so as to have an aplanatic surface by satisfying Condition (3) below.

$$NA' = NA_1 \times N_2 \quad \text{Condition (3)}$$

where

NA' is the numerical aperture of the objective lens $NA_1$ is the numerical aperture of the first lens element $L_1$ and $N_2$ is the index of refraction of the second lens element $L_2$.

Thus, if the numerical aperture of the first lens element $L_1$ is 0.6 and the index of refraction of the second lens element $L_2$ is 1.5, the numerical aperture of the objective lens must be 0.9 for the second lens element to have an aplanatic surface. When Condition (3) is satisfied the convergence of a cone of rays can be increased (or decreased) without introduction of spherical aberration, coma or astigmatism. As known in the art, there are alternative conditions which may also be satisfied for a surface to be "aplanatic" (as described, for example, at page 365 in *Modern Optical Engineering* by Warren J. Smith, McGraw Hill, N.Y., 1966). If any of the alternative conditions is satisfied, all are satisfied. One such alternative condition is Condition (4) below $$S' = S/N_2 \quad \text{Condition (4)}$$

where
- S' is the image point distance of the second lens element $L_2$, and
- S is the object point distance of the second lens element $L_2$.

When the radius of curvature of the surface on the optical recording medium side of the second lens element $L_2$ is made exactly equal to the back focal length of the objective lens (i.e., $R_4/BF=1.0$), rays being imaged onto or read from the image point of the objective lens do not undergo any refraction at this surface, and thus there is no spherical aberration generated by the entire second lens element $L_2$ (assuming the other surface is aplanatic) and the sine condition is satisfied.

The above assumes, as a premise, that no cover glass is used on the optical recording medium side of the objective lens. However, where there is a cover glass, the cover glass introduces aberrations which must be accounted for and corrected by the objective lens. Nevertheless, by satisfying condition (1), and preferably, condition (2) above, the design and construction of the objective lens is simplified and high optical performance is achieved.

With the lens of Embodiment 1, as explained above, Condition (1) is satisfied, and indeed the ration of $R_4/BF$ equals 1. In the state in which there is a cover glass on the optical recording medium side, even if the first lens element $L_1$ independently is well-corrected for aberrations, because the numerical aperture of the first lens element $L_1$ and the numerical aperture of the objective lens system are mutually different notwithstanding the adoption of an aplanatic surface in the second lens element $L_2$, an aberration is produced by the objective lens. At this time, it would be well if the second lens element $L_2$ could be adjusted slightly away from having an aplanatic surface. However, in this instance, the back focal length of the objective lens and the radius of curvature on the optical recording medium side of the second lens element $L_2$ also should be adjusted slightly. However, by satisfying Condition (1) above, and to the extent possible also Condition (2) above, aberrations of the objective lens may be well-corrected even with a cover glass.

However, with the lens of Embodiment 1, which has no cover glass, Condition (3) above (and thus, Condition (4) above, as well) should ideally be satisfied.

By satisfying the Condition (2), the first and second lens elements $L_1$ and $L_2$ can be constructed without greatly changing them from a conventional design. In the case that the lower limit of Condition (2) is lowered, by making the entire objective lens system to have a high numerical aperture, the numerical aperture NA of the first lens element $L_1$ must be independently made high, and the application of conventional design and construction technology in its existent state becomes difficult.

If the upper limit of the Condition (2) is raised, then the focal length of the second lens element $L_2$ becomes shorter, and the refractive power becomes greater. Thus, construction errors in the radius of curvature of the surface of the second lens element $L_2$, the eccentricity, and the like become extreme and there is an increase in the cost of construction of the second lens element $L_2$.

Embodiment 2

FIG. 1 also illustrates the objective lens of Embodiment 2, since the construction of this embodiment is very similar to that of Embodiment 1. Indeed, the first lens element $L_1$ of this embodiment is identical in construction to that of Embodiment 1 and the numerical aperture is again 0.9.

Table 2 below shows, for Embodiment 2 of the present invention, the surface number # in order from the light source side, the radius of curvature R (in mm) of each surface, the on-axis spacing D (in mm) between surfaces, as well as the index of refraction N and the Abbe number ν at the wavelength 413 nm of each lens element. Those surfaces with a * to the right of the surface number are ashperic, with the aspheric coefficients given in the middle portion of Table 2. Since use is made of the same lens element $L_1$ as in Embodiment 1, the value of each constant of its aspheric surfaces is the same as that of Embodiment 1. The lower portion of the table gives the incident light flux diameter Φ (in mm), the focal length F (in mm) of the objective lens, the focal length $F_1$ (in mm) of the first lens element $L_1$, the back focus BF (in mm) of the objective lens, as well as the values corresponding to the Conditions (1) and (2).

TABLE 2

| Surface No. # | On-axis Radius of Curvature (R) | On-axis surface spacing (D) | Index of Refraction N at $\lambda$ = 413 nm | Abbe No. ν at $\lambda$ = 413 nm |
|---|---|---|---|---|
| 1* | 2.6586 | 2.30000 | 1.603351 | 61.9 |
| 2* | −29.0491 | 0.03334 | 1.000000 | |
| 3 | 1.0944 | 1.00000 | 1.527118 | 64.7 |
| 4 | 0.8111 | | 1.000000 | |

| | Aspheric Coefficients | | | | |
|---|---|---|---|---|---|
| # | $A_4$ | $A_6$ | $A_8$ | $A_{10}$ | K |
| 1 | $0.3590876 \times 10^{-2}$ | $0.8604661 \times 10^{-4}$ | $0.5038918 \times 10^{-6}$ | $-0.1439604 \times 10^{-5}$ | 0.0 |
| 2 | $0.4883467 \times 10^{-2}$ | $-0.1069792 \times 10^{-2}$ | $0.1095095 \times 10^{-3}$ | $-0.4841916 \times 10^{-5}$ | 0.0 |

Incident light flux diameter Φ=4.89 F=2.7177 $F_1$=4.1502 BF=0.811

Condition (1) value: $R_4/BF$=1.0000

Condition (2) value: $F_1/F$=1.5271

Thus, Embodiment 2 satisfies Conditions (1) and (2).

Embodiment 3

The objective lens of Embodiment 3 has the same numerical aperture (0.9) as Embodiment 1, and the first lens element $L_1$ is identical in construction.

Table 3 below shows, for Embodiment 3 of the present invention, the surface number # in order from the light source side, the radius of curvature R (in mm) of each surface, the on-axis spacing D (in mm) between surfaces, as well as the index of refraction N and the Abbe number ν at the wavelength 413 nm of each lens element. Those surfaces with a * to the right of the surface number are ashperic, with the aspheric coefficients given in the middle portion of Table 3. The lower portion of the table gives the incident light flux diameter Φ (in mm), the focal length F (in mm) of the objective lens, the focal length $F_1$ (in mm) of the first lens element $L_1$, the back focus BF (in mm) of the objective lens, as well as the values corresponding to the Conditions (1) and (2). Since the lens element $L_1$ is again identical to that of Embodiment 1, the value of each constant of its aspheric surfaces is the same as that of Embodiment 1.

TABLE 3

| Surface No. # | On-axis Radius of Curvature (R) | On-axis surface spacing (D) | Index of Refraction N at $\lambda$ = 413 nm | Abbe No. ν at $\lambda$ = 413 nm |
|---|---|---|---|---|
| 1* | 2.6586 | 2.30000 | 1.603351 | 61.9 |
| 2* | −29.0491 | 0.03084 | 1.000000 | |

TABLE 3-continued

| | | | | |
|---|---|---|---|---|
| 3 | 1.0299 | 1.00000 | 1.687961 | 57.0 |
| 4 | 0.6400 | | 1.000000 | |

Aspheric Coefficients

| # | $A_4$ | $A_6$ | $A_8$ | $A_{10}$ | K |
|---|---|---|---|---|---|
| 1 | $0.3590876 \times 10^{-2}$ | $0.8604661 \times 10^{-4}$ | $0.5038918 \times 10^{-6}$ | $-0.1439604 \times 10^{-5}$ | 0.0 |
| 2 | $0.4883467 \times 10^{-2}$ | $-0.069792 \times 10^{-2}$ | $0.1095095 \times 10^{-3}$ | $-0.4841916 \times 10^{-5}$ | 0.0 |

Incident light flux diameter $\Phi=4.43$ $F=2.4587$ $F_1=4.1502$ $BF=0.640$

Condition (1) value: $R_4/BF=1.0000$

Condition (2) value: $F_1/F=1.6880$

Thus, Embodiment 3 satisfies Conditions (1) and (2).

Embodiment 4

Figure 4:
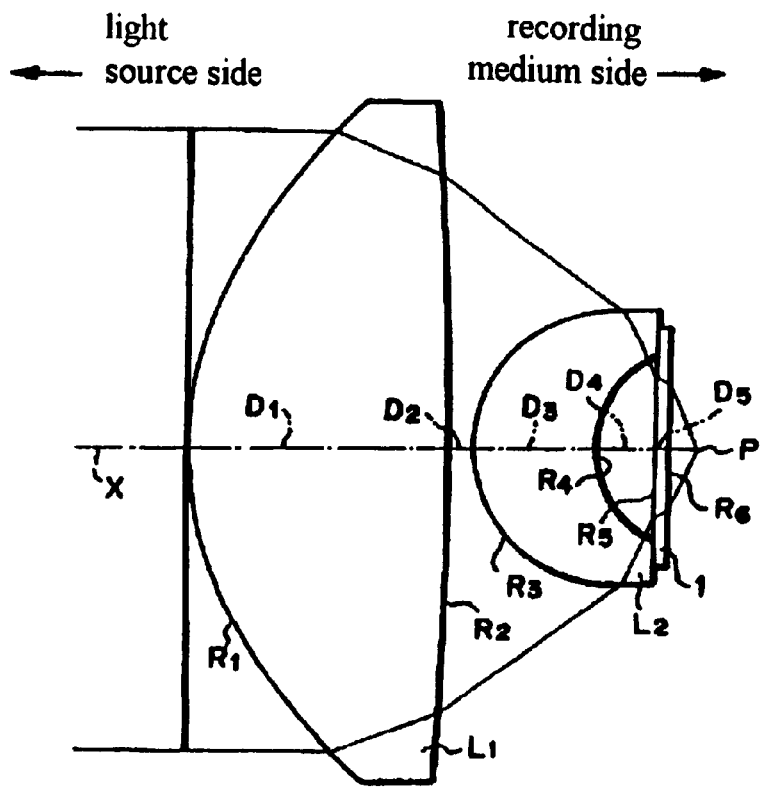
FIG. 4 shows the lens element construction and the optical paths of the objective lens of Embodiment 4 that may be used for the high density optical recording or reading of data.

FIG. 4 shows the lens element construction and light paths of an objective lens according to Embodiment 4, where P is the light collecting point and X is the optical axis.

The objective lens used for the high density optical recording medium relating to Embodiment 4, as shown in FIG. 4, is constructed from two lens elements which are approximately the same as Embodiment 1, with a cover glass 1 arranged on the optical recording medium side of the second lens $L_2$.

Furthermore, it is possible to selectively locate the cover glass 1 in a position between the surface of the light source side of the second lens $L_2$, and the light collecting point P.

With the present embodiment, due to the arrangement of a cover glass on the optical recording medium side, an aplanatic surface is not achieved. However, as with Embodiment 1, Conditions (1) and (2) are satisfied. Furthermore, the numerical aperture of the objective lens is once again equal to 0.9.

Table 4 below shows, for Embodiment 4 of the present invention, the surface number # in order from the light source side, the radius of curvature R (in mm) of each surface, the on-axis spacing D (in mm) between surfaces, as well as the index of refraction N and the Abbe number ν at the wavelength 413 nm of each lens element. Those surfaces with a * to the right of the surface number are ashperic, with the aspheric coefficients as given in the middle portion of Table 4. The lower portion of the table gives the incident light flux diameter Φ (in mm), the focal length F (in mm) of the objective lens, the focal length $F_1$ (in mm) of the first lens element $L_1$, the back focus BF (in mm) of the objective lens, as well as the values corresponding to the Conditions (1) and (2).

TABLE 4

| Surface No. # | On-axis Radius of Curvature (R) | On-axis surface spacing (D) | Index of Refraction N at λ = 413 nm | Abbe No. ν at λ = 413 nm |
|---|---|---|---|---|
| 1* | 3.0065 | 2.23000 | 1.603351 | 61.9 |
| 2* | -20.3309 | 0.25000 | 1.000000 | |
| 3 | 1.1285 | 1.03000 | 1.527118 | 64.7 |
| 4 | 0.8996 | 0.52000 | 1.000000 | |

TABLE 4-continued

| | | | | |
|---|---|---|---|---|
| 5 (cover glass) | ∞ | 0.10000 | 1.537978 | 55.0 |
| 6 (cover glass) | ∞ | | | |

Aspheric Coefficients

| # | $A_4$ | $A_6$ | $A_8$ | $A_{10}$ | K |
|---|---|---|---|---|---|
| 1 | $0.2361717 \times 10^{-2}$ | $0.5220805 \times 10^{-4}$ | $-0.7402689 \times 10^{-6}$ | $-0.2438281 \times 10^{-6}$ | 0.0 |
| 2 | $0.3604410 \times 10^{-2}$ | $-0.4572956 \times 10^{-3}$ | $0.3473610 \times 10^{-4}$ | $-0.1328485 \times 10^{-5}$ | 0.0 |

Incidental light flux diameter $\Phi=5.09$ $F=2.8283$ $F_1=4.5030$ $BF=0.8654$

Condition (1) value: $R_4/BF=1.0395$

Condition (2) value: $F_1/F=1.5921$

Thus, Embodiment 4 satisfies Conditions (1) and (2).

Figure 5:
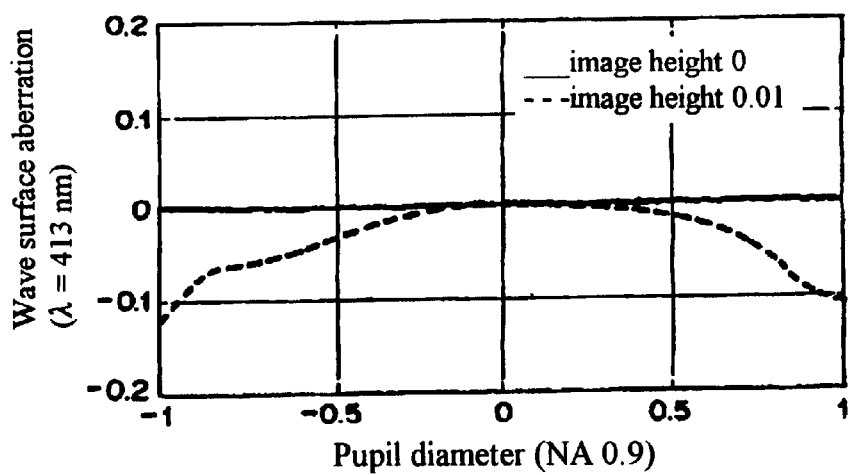
FIG. 5 shows, for two image heights, the wave surface aberration as a function of pupil diameter at a wavelength of 413 nm of the objective lens of Embodiment 4.

FIG. 5 shows, for two image heights, the wave surface aberration as a function of pupil diameter at a wavelength of 413 nm of the objective lens of Embodiment 4. As is shown in FIG. 5, it is clear that the objective lens is well-corrected for aberrations. The objective lens of Embodiment 5 uses approximately the same lens element structure as shown in Embodiment 4, and thus a separate figure illustrating the lens element structure of this embodiment is omitted. In this embodiment as well, the numerical aperture of the objective lens is 0.9.

Table 5 below shows, for Embodiment 5 of the present invention, the surface number # in order from the light source side, the radius of curvature R (in mm) of each surface, the on-axis spacing D (in mm) between surfaces, as well as the index of refraction N and the Abbe number ν at the wavelength 413 nm of each lens element. Those surfaces with a * to the right of the surface number are ashperic, with the aspheric coefficients as given in the middle portion of the Table. The lower portion of the table gives the incident light flux diameter Φ (in mm), the focal length F (in mm) of the objective lens, the focal length $F_1$ (in mm) of the first lens element $L_1$, the back focus BF (in mm) of the objective lens, as well as the values corresponding to the Conditions (1) and (2).

TABLE 5

| Surface No. # | On-axis Radius of Curvature (R) | On-axis surface spacing (D) | Index of Refraction N at λ = 413 nm | Abbe No. ν at λ = 413 nm |
|---|---|---|---|---|
| 1* | 3.6335 | 2.61000 | 1.603351 | 61.9 |
| 2* | -16.1719 | 0.28500 | 1.000000 | |
| 3 | 1.2120 | 1.21100 | 1.758254 | 42.0 |
| 4 | 0.7030 | 0.42000 | 1.000000 | |
| 5 (cover glass) | ∞ | 0.10000 | 1.537978 | 55.0 |
| 6 (cover glass) | ∞ | | | |

Aspheric Coefficients

| # | $A_4$ | $A_6$ | $A_8$ | $A_{10}$ | K |
|---|---|---|---|---|---|
| 1 | $0.1188866 \times 10^{-2}$ | $0.2130272 \times 10^{-4}$ | $0.1426067 \times 10^{-5}$ | $-0.6323625 \times 10^{-7}$ | 0.0 |
| 2 | $0.2433003 \times 10^{-2}$ | $-0.1645419 \times 10^{-3}$ | $0.1294952 \times 10^{-4}$ | $-0.1124175 \times 10^{-5}$ | 0.0 |

Incident light flux diameter Φ=5.22 F=2.9001 $F_1$=5.1740 BF=0.7274

Condition (1) value: $R_4/BF$=0.9665

Condition (2) value: $F_1/F$=1.784

As shown in Table 5, Embodiment 5 satisfies Condition (1) but not Condition (2).

As a lens used for high density optical recording, it is desirable that the second lens element of the present invention include an aplanatic surface. However, even if this can not be achieved, by satisfying the Condition (2), an operational effect can be achieved which approximates the case of the second lens element including an aplanatic surface.

The objective lens of the present invention is not limited to the above-described embodiments, and possible modifications will be immediately apparent to those of ordinary skill in the art. For example, it is possible to appropriately change the radius of curvature R and the surface spacings of each of the lens elements. Further, the invention may be applied to an objective lens which arranges the object point at a finite distance. Such modifications are not to be regarded as a departure from the spirit and scope of the invention. Rather the scope of the invention shall defined as set forth in the following claims and their legal equivalents.

What is claimed is:

1. An objective lens having a light source side and a recording medium side and used for reading or writing at high density on a recording medium, said objective lens having no more than two lens elements with refractive power and comprising, in order from the light source side:

a first lens element of bi-convex shape and having at least one surface that is aspheric, and a second lens element of a meniscus shape having its concave surface on the recording medium side, wherein the following condition is satisfied $$0.8 < R_4/BF < 1.2$$

where $R_4$ is the radius of curvature of the surface of the second lens element on the recording medium side of the objective lens, and BF is the back focal length of the objective lens.

2. The objective lens of claim 1, wherein the second lens element includes an aplanatic surface.

3. The objective lens of claim 2, wherein the radius of curvature of the surface of the second lens element on the optical recording medium side is substantially equal to the back focal length of objective lens.

4. The objective lens of claim 1, wherein both surfaces of the first lens element are aspheric.

5. The objective lens of claim 1, wherein the following condition is also satisfied:

$$1.45 < F_1/F < 1.7$$

where $F_1$ is the focal length of the first lens and

F is the focal length of the objective lens.

6. An objective lens having a light source side and a recording medium side and used for reading or writing at high density on a recording medium, said objective lens having no more than two lens elements with refractive power and comprising, in order from a light source side:

a first lens element of bi-convex shape and having at least one surface that is aspheric, and a second lens element of meniscus shape with its concave surface on the recording medium side, wherein the following condition is satisfied $$NA' = NA_1 \times N_2$$

where

NA' is the numerical aperture of the objective lens, $NA_1$ is the numerical aperture of the first lens element $L_1$ and $N_2$ is the index of refraction of the second lens element $L_2$.

7. An objective lens having a light source side and a recording medium side and used for reading or writing at high density on a recording medium, said objective lens having no more than two lens elements with refractive power and comprising, in order from a light source side:

a first lens element of bi-convex shape and having at least one surface that is aspheric, and a second lens element of meniscus shape with its concave surface on the side of the recording medium, wherein the following condition is satisfied $$S' = S/N_2$$

where

S' is the image point distance of the second lens element $L_2$,

S is the object point distance of the second lens element $L_2$ and $N_2$ is the index of refraction of the second lens element $L_2$.

* * * * *

UNITED STATES PATENT AND TRADEMARK OFFICE
CERTIFICATE OF CORRECTION

PATENT NO. : 6,353,588 B1
DATED : March 5, 2002
INVENTOR(S) : Ori

It is certified that error appears in the above-identified patent and that said Letters Patent is hereby corrected as shown below:

Title page,
Under References Cited add:

-- U.S. PATENT DOCUMENTS

| | | | |
|---|---|---|---|
| 4,765,723 A | * | 8/1988 | Takamura ..........359/719 |
| 5,880,893 A | * | 3/1999 | Suganuma ..........359/717 |
| 6,058,095 A | * | 5/2000 | Yamamoto et al.....369/112.24 |

[*], cited by the Examiner --;

Item [57], ABSTRACT,
Line 20, change "of objective lens" to -- of the objective lens --;

Column 1,
Line 52, change "numerical aperture" to -- a numerical aperture --;

Column 2,
Line 36, change "data." to -- data, and --;
Line 55, change Equation (2) to:

-- $Z = (Y^2 / R^2) / ((1+(1-KY^2 / R^2)^{1/2}) + A_4 Y^4 + A_6 Y^6 + A_8 Y^8 + A_{10} Y^{10} \ldots$ Equation (2) --;
Line 67, change "dis" to -- dis- --;

Column 5,
Line 23, change "ration" to -- ratio --; and

UNITED STATES PATENT AND TRADEMARK OFFICE
CERTIFICATE OF CORRECTION

PATENT NO.   : 6,353,588 B1
DATED        : March 5, 2002
INVENTOR(S)  : Ori

It is certified that error appears in the above-identified patent and that said Letters Patent is hereby corrected as shown below:

Column 7,
Lines 11-12, change "-0.069792 x$10^{-2}$" to -- -0.1069792 x $10^{-2}$ --.

Signed and Sealed this

Sixth Day of August, 2002

Attest:

JAMES E. ROGAN
Attesting Officer      Director of the United States Patent and Trademark Office